United States Patent [19]

Sisbarro

[11] Patent Number: 5,261,736
[45] Date of Patent: Nov. 16, 1993

[54] SAFETY TOP MODULAR DOOR CLOSURE SYSTEM FOR A VAPOR DEGREASER

[76] Inventor: Thomas A. Sisbarro, 536 Killin Ct., Reynoldsburg, Ohio 43068

[21] Appl. No.: 892,775

[22] Filed: Jun. 3, 1992

[51] Int. Cl.5 .............................. A47B 96/00
[52] U.S. Cl. ................. 312/319.8; 220/681; 220/693; 220/345; 49/28; 49/360
[58] Field of Search .......... 312/296, 318, 319.8, 312/139; 220/681, 692, 693, 345; 49/28, 100, 116, 118, 125, 127, 130, 360, 362, 363, 366, 368

[56] References Cited

U.S. PATENT DOCUMENTS

| | | | |
|---|---|---|---|
| 870,477 | 11/1907 | Snyder | 220/345 |
| 2,276,635 | 3/1942 | Weber | 220/345 |
| 2,953,276 | 9/1960 | Dunn | 220/681 X |
| 3,208,809 | 9/1965 | Quimper | 220/345 X |
| 3,295,907 | 1/1967 | Galvin | 220/345 X |
| 3,858,752 | 1/1975 | Marvin, Jr. et al. | 220/681 X |
| 3,863,390 | 2/1975 | Sawdai | 49/360 |
| 3,872,622 | 3/1975 | Berk | 49/360 X |

FOREIGN PATENT DOCUMENTS 2917797 11/1980 Fed. Rep. of Germany ......... 49/28

Primary Examiner—Kenneth J. Dorner
Assistant Examiner—Brian K. Green
Attorney, Agent, or Firm—Michael I. Kroll

[57] ABSTRACT

A safety top modular door closure system is provided for a vapor degreaser and consists of a mechanism for mounting an open bottom of an enclosure to a top access area of a solvent fluid holding tank of the vapor degreaser. A horizontal sliding double door assembly is affixed to an open top of the enclosure and structure is available for operating the horizontal sliding double door assembly. The horizontal sliding double door assembly can go from a closed position into an open position to allow the insertion of articles therethrough into the tank of the vapor degreaser and from the open position back to the closed position to significantly reduce solvent vapor emissions from the tank of the vapor degreaser.

12 Claims, 3 Drawing Sheets

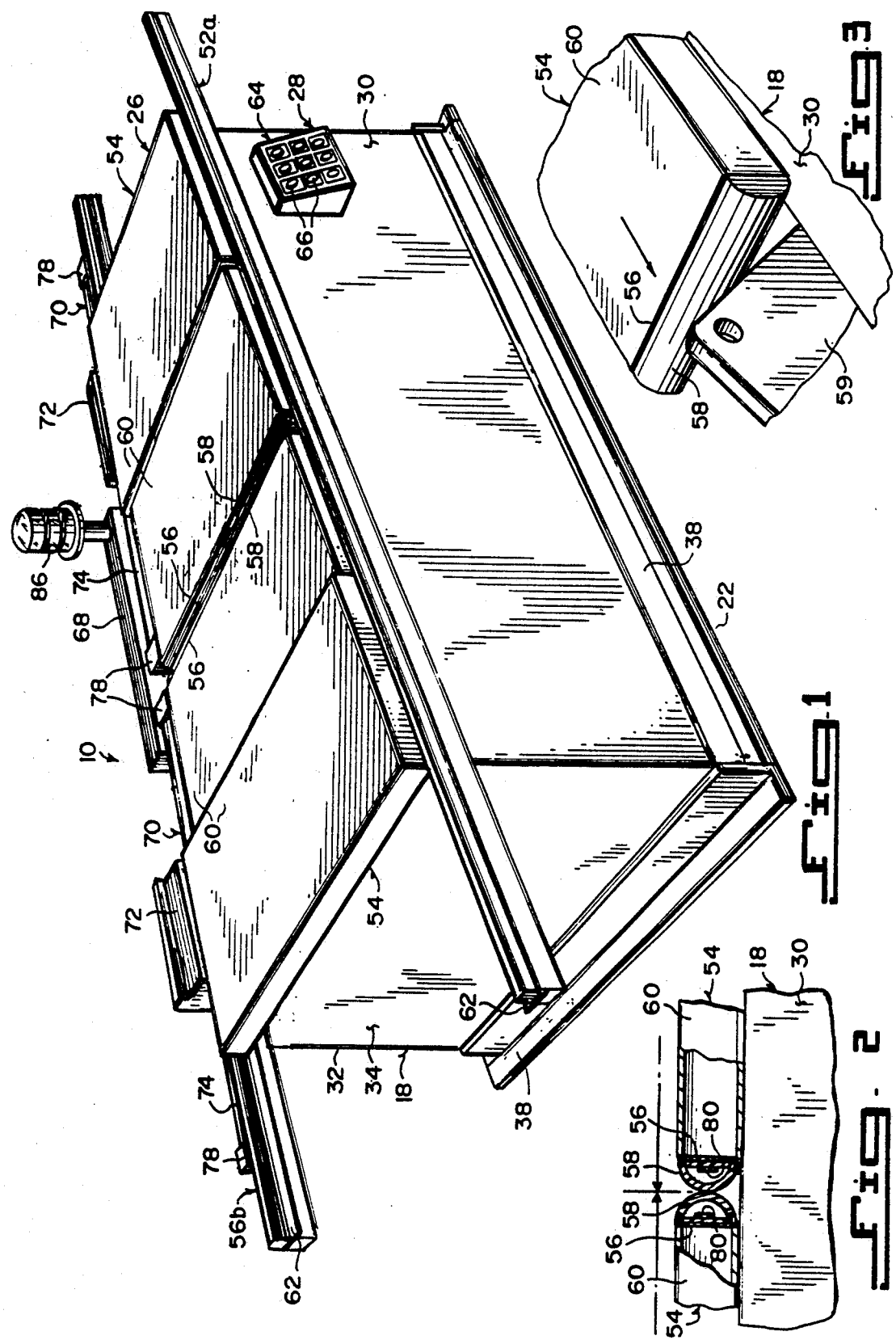

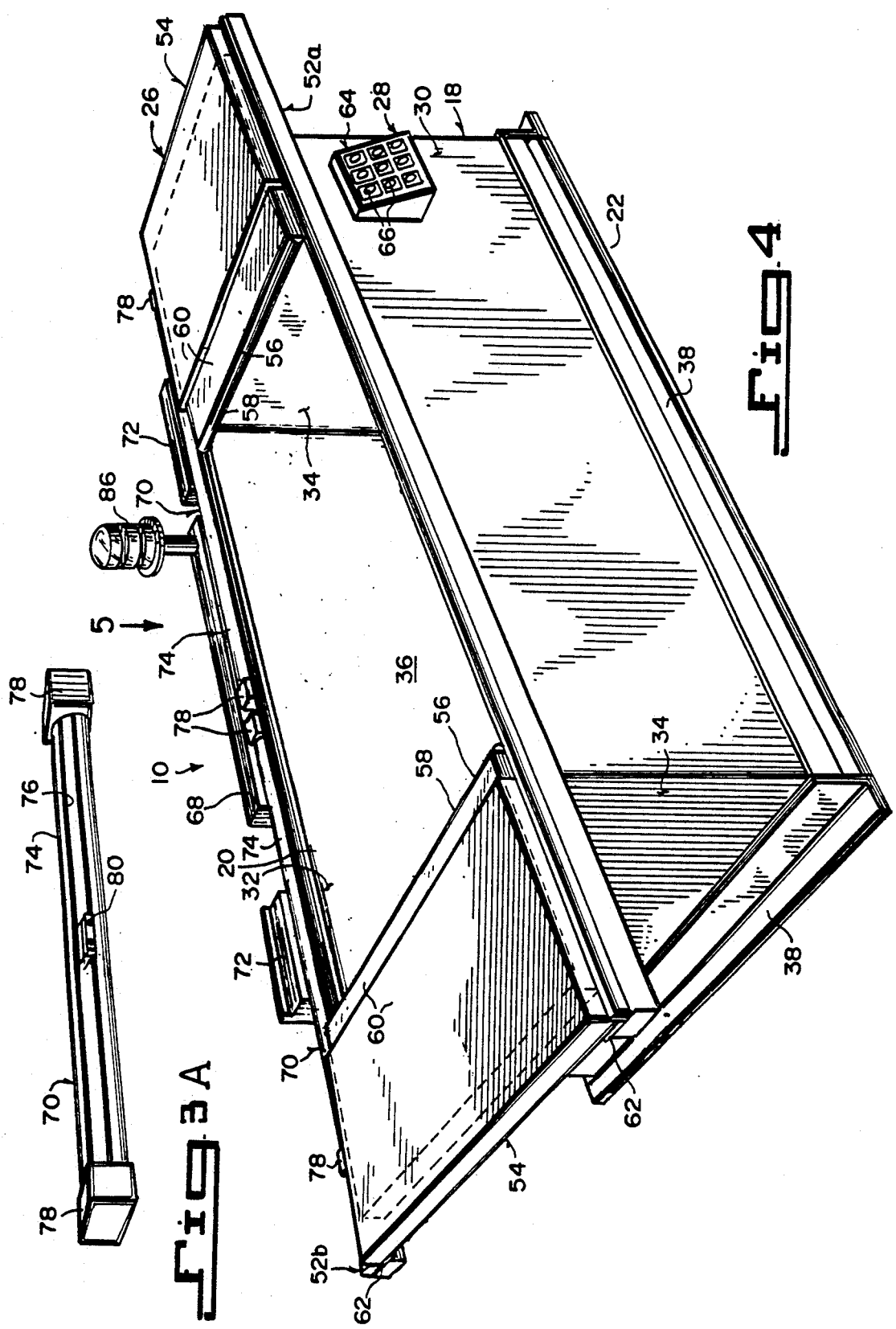

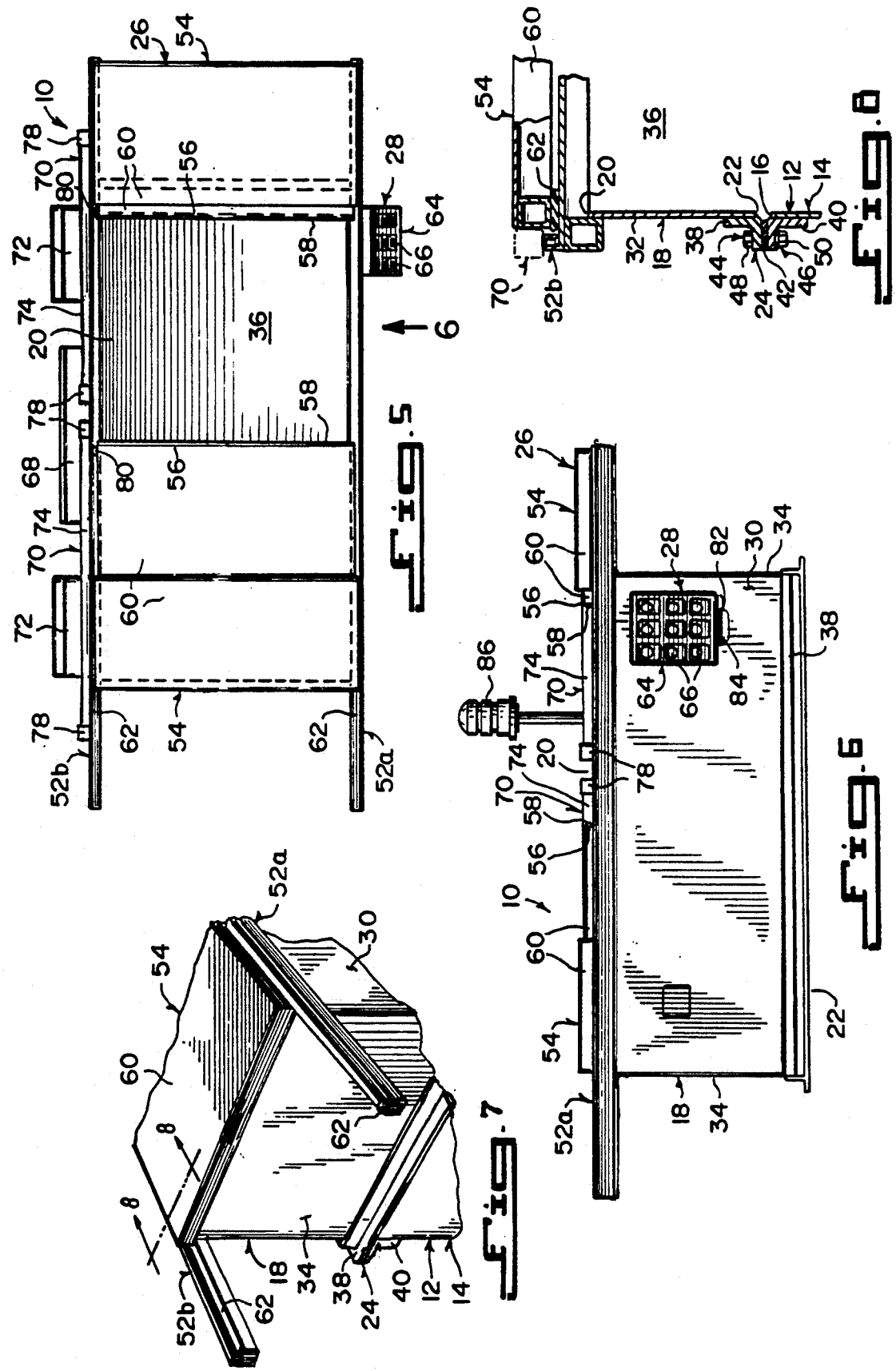

SAFETY TOP MODULAR DOOR CLOSURE SYSTEM FOR A VAPOR DEGREASER

BACKGROUND OF THE INVENTION

1. Field of the Invention

The instant invention relates generally to vapor degreasers and more specifically it relates to a safety top modular door.

2. Description of the Prior Art

Numerous vapor degreasers have been provided in prior art that are adapted to be solvent fluid filled tanks for insertion of various items to be cleaned, whereby solvent vapor emissions, such as trichloroethan 1.1.1. or Freon, can exit therefrom and enter the atmosphere in the work environment to endanger people.

Large conventionally hinged doors that are awkward and difficult to use are utilized. These doors are sometimes powered or counter-balanced. Due to their size, weight, unwieldy nature and ineffectiveness at vapor containment it is not uncommon for operators to leave the doors open for long periods of time, thus exposing the work zone and environment to excessive fume generation and solvent consumption. In other cases, there are manually operated sliding covers that are not effectively utilized for the same reasons. While these units may be suitable for the particular purpose to which they address, they would not be as suitable for the purposes of the present invention as heretofore described.

SUMMARY OF THE INVENTION

A primary object of the present invention is to provide a safety top modular door closure system for a vapor degreaser that will overcome the shortcomings of the prior art devices.

Another object is to provide a safety top modular door closure system for a vapor degreaser that utilizes two horizontal sliding door assemblies, which will significantly reduce solvent vapor emissions when the door assemblies are closed.

An additional object is to provide a safety top modular door closure system for a vapor degreaser, in which the door assemblies are operated by pneumatic powered actuators that are controlled by push button switches making it safer for a person to operate the system.

A further object is to provide a safety top modular door closure system for a vapor degreaser that is simple and easy to use.

A still further object is to provide a safety top modular door closure for a vapor degreaser that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the instant invention with the doors closed.

FIG. 2 is an enlarged front view with parts broken away showing the bumpers with their internal pressure greater detail.

FIG. 3 is an enlarged front perspective view showing the right bumper engaging an obstruction.

FIG. 3A is a perspective view of one of the pneumatic actuators per se.

FIG. 4 a front perspective view similar to FIG. 1 with the doors opened.

FIG. 5 is a top view taken in direction of arrow 5 in FIG. 4 with the left door closed.

FIG. 6 is a front view taken in direction of arrow 6 in FIG. 5.

FIG. 7 is a front perspective view of the left side of the instant invention mounted to the vapor degreaser.

FIG. 8 is a cross sectional view taken along line 8—8 in FIG. 7.

DETAILED DESCRIPTION OF THE PREFERRED EMBODIMENTS

Turning now descriptively to the drawings, in which similar reference characters denote similar elements throughout the several views, the Figures illustrate a safety top modular door closure system 10 for a vapor degreaser 12 of the type being a solvent fluid holding tank 14 having a top access area 16. The system 10 consists of an enclosure 18 having an open top 20 and an open bottom 22. A mechanism 24 is for mounting the open bottom 22 of the enclosure 18 to the top access area 16 of the tank 14 of the vapor degreaser 12. A horizontal sliding double door assembly 26 is affixed to the open top 20 of the enclosure 18. A structure 28 is for operating the horizontal sliding double door assembly 26. The horizontal sliding double door assembly 26 can go from a closed position into an open position to allow the insertion of articles therethrough into the tank 14 of the vapor degreaser 12 and from the open position back to the closed position to significantly reduce solvent vapor emissions from the tank 14 of the vapor degreaser 12.

The enclosure 18 contains a front wall 30, a rear wall 32 and a pair of side walls 34, so as to form a chamber 36 therein to receive the solvent vapor emissions from the tank 14 of the vapor degreaser 12.

The mounting mechanism includes a first L-shaped flange member 38 affixed adjacent to a bottom edge of the front wall 30, the rear wall 32 and the side walls 34 of the enclosure 18. A second L-shaped flange member 40 is affixed adjacent to a top edge of the tank 14 of the vapor degreaser 12. A gasket seal 42 is positioned between the first L-shaped flange member 38 and the second L-shaped flange member 40. A mechanism 44 is for securing the first L-shaped flange member 38, the gasket seal 42 and the second L-shaped flange member 40 together, so that the solvent vapor emissions from the tank 14 of the vapor degreaser 12 will not escape before entering the chamber 36 of the enclosure 18.

The system as recited in claim 3, wherein the securing mechanism 44 is a plurality of spaced apart fasteners 46, wherein each said fastener 46 consists of a bolt 48 and nut 50. The bolt 48 has an externally threaded shank which extends through the first L-shaped flange member 38, the gasket seal 42 and the second L-shaped flange member 40. The nut 50 has an internally threaded aperture to engage with the externally threaded shank of the bolt 48.

The horizontal sliding double door assembly 26 contains a pair of spaced apart guide tracks 52a and 52b.

The first guide track 52a is attached along a top edge of the front wall 30 of the enclosure 18, while the second guide track 52b is attached along a top edge of the rear wall 32 of the enclosure 12. The guide tracks 52a and 52b overhang the side walls 34 of the enclosure 18. A pair of door covers 54 will ride within the guide tracks 52a and 52b, so that the inwardly facing edges 56 of the door covers can come together when the door covers 54 are placed in the closed position.

The horizontal sliding double door assembly 26 further includes a pair of flexible bumper units 58, each mounted to one of the inwardly facing edges 56 of each door cover 54. When the door covers 54 come together in the closed position, the flexible bumper units 58 will act as a cushion if an obstruction 59 is extending therebetween.

Each door cover 54 can be a two piece telescoping structure 60 to extend over a portion of the open top 20 of the enclosure 18 in the guide tracks 52a and 52b. Each guide track 52a and 52b includes a bearing plate 62 fabricated out of a waxy, opaque polytetrafluroethylene material to prevent sticking of the door covers 54.

The operating structure 28 contains a control station 64 mounted to the front wall 30 of the enclosure 18. The control station 64 has a plurality of push button switches 66 thereon to be operated by a person. An electronics control module 68 is mounted to the rear wall 32 of the enclosure 18 and electrically connected to the push button switches 66 in the control station 64. A pair of actuators 70 are each mounted onto an opposite side of the second guide track 52b to engage with one door cover 54. A pair of actuator operating modules 72 are also provided with each mounted onto an opposite side of the rear wall 32 of the enclosure 18 is electrically connected between the electronics control module 68 and to one actuator 70. When the person presses the proper push button switches 66 on the control station 64, the respective actuator 70 will slide the respective door cover 54 in the guide tracks 52a and 52b to the opened and closed positions.

Each actuator 70 includes a cylinder 74 having an elongated slot 76 therealong. A mounting bracket 78 is located on each end of the cylinder 74, so that the cylinder 74 can be retained in a stationary position to the second guide track 52b. A shuttle 80 extends through the elongated slot 76 in the cylinder 74 to be coupled to a side of the respective door cover 54. The shuttle 80 is driven to slide within an elongated slot 76 in the cylinder 74 to operate the respective door cover 54. The shuttle 80 can be driven by hydraulic, electric or pneumatic mechanisms (not shown).

Each flexible bumper unit 58 contains an internal pressure switch 80 that runs the full length of the inwardly facing edge 56 of the door cover 54 and is electrically connected to the respective actuator operating module 72. If any obstruction 59 contacts one of the flexible bumper units 58 the internal pressure switch 80 will close to shut down the respective actuator 70 and stop the respective door cover 54 from closing.

The safety top modular door closure system 10 further includes a mechanism 82 for automatically closing the door covers 54 after a preset and variable time span when the system 10 is not being used. The operator does not have to manually close the door covers 54 when the operation is complete. The automatically closing mechanism 82 is a timer 84 electrically connected to the electronics control module 68 to by-pass the push button switches 66 in the control station 64. A warning beacon 86 can be electrically connected to the electronics control module 68, which will flash when the timer 84 is inhibited.

LIST OF REFERENCE NUMBERS 10 safety top modular door closure system
12 vapor degreaser
14 solvent fluid holding tank
16 top access area in 14
18 enclosure
20 open top in 18
22 open bottom in 18
24 mounting mechanism
26 horizontal sliding double door assembly
28 operating structure
30 front wall of 18
32 rear wall of 18
34 side wall of 18
36 chamber in 18
38 first L-shaped flange member
40 second L-shaped flange member
42 gasket seal
44 securing mechanism
46 fastener for 44
48 bolt for 46
50 nut for 46
52a first guide track
52b second guide track
54 door cover
56 inwardly facing edge of 54
58 flexible bumper unit
59 obstruction
60 two piece telescoping structure
62 bearing plate
64 control station
66 push button switch
68 electronics control module
70 actuator
72 actuator operating module
74 cylinder
76 elongated slot in 74
78 mounting bracket
80 internal pressure switch in 58
82 automatically closing mechanism
84 timer for 82
86 warning beacon It will be understood that each of the elements described above, or two or more together may also find a useful application in other types of methods differing from the type described above.

While certain novel features of this invention have been shown and described and are pointed out in the annexed claims, it is not intended to be limited to the details above since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A safety top modular door closure system for a vapor degreaser of a type that is a solvent fluid holding tank having a top access area, said system comprising:
   a) an enclosure having an open top and an open bottom;
   b) means for mounting the open bottom of said enclosure to the top access area of the tank of the vapor degreaser, said enclosure includes a front wall, a rear wall, and a pair of side walls, so as to form a chamber therein to receive a solvent vapor emissions from the tank of the vapor degreaser, a horizontal sliding double door assembly affixed to the open top of said enclosure, and means for operating said horizontal sliding double door assembly, so that said horizontal sliding double door assembly can go from a closed position into an open position to allow the insertion of articles therethrough into the tank of the vapor degreaser and from the open position back to the closed position to significantly reduce solvent vapor emissions from the tank of the vapor degreaser, said mounting means includes a first L-shaped flange member affixed adjacent to a bottom edge of said front wall, said rear wall and said side walls of said enclosure, a second L-shaped flange member affixed adjacent to a top edge of the tank, a gasket seal positioned between said first L-shaped flange member and said second L-shaped flange member, and means for securing said first L-shaped flange member, said gasket seal and said second L-shaped flange member together, so that the solvent vapor emissions from the tank of the vapor degreaser will not escape before entering the chamber of said enclosure;

2. A safety top modular door closure system as recited in claim 1, wherein said securing means includes a plurality of spaced apart fasteners.

3. A safety top modular door closure system as recited in claim 2, wherein each said fastener includes:
   a) a bolt having an externally threaded shank which extends through said first L-shaped flange member, said gasket seal and said second L-shaped flange member; and
   b) a nut having an internally threaded aperture to engage with the externally threaded shank of said bolt.

4. A safety top modular door closure system as recited in claim 3, wherein said horizontal sliding double door assembly includes:
   a) a pair of spaced apart guide tracks, in which a first guide track is attached along a top edge of said front wall of said enclosure, while a second guide track is attached along a top edge of said rear wall of said enclosure, with said guide tracks overhanging said side walls of said enclosure; and
   b) a pair of door covers that will ride within said guide tracks, so that the inwardly facing edges of said door covers can come together when said door covers are placed in the closed position.

5. A safety top modular door closure system as recited in claim 4, wherein said horizontal sliding double door assembly further includes a pair of flexible bumper units, each mounted to one of the inwardly facing edges of each said door cover, so that when said door covers come together in the closed position said flexible bumper units will act as cushions if an obstruction is extending therebetween.

6. A safety top modular door closure system as recited in claim 5, wherein each said door cover includes a two piece telescoping structure to extend over a portion of the open top of said enclosure in said guide tracks.

7. A safety top modular door closure system as recited in claim 6, wherein each said guide track includes a bearing plate fabricated out of a waxy, opaque polytetrafluoroethylene material to prevent sticking of said door covers.

8. A safety top modular door closure system as recited in claim 7, wherein said operating means includes:
   a) a control station mounted to said front wall of said enclosure, said control station having a plurality of push button switches thereon to be operated by a person;
   b) an electronics control module mounted to said rear wall of said enclosure and electrically connected to the push button switches in said control station;
   c) a pair of actuators, each mounted onto an opposite side of said second guide track to engage with one said door cover; and
   d) a pair of actuator operating modules, each mounted onto an opposite side of said rear wall of said enclosure and electrically connected between said electronics control module and to one said actuator, so that when the person presses the proper push button switches on said control station, said respective actuator will slide said respective door cover in said guide tracks to the opened and closed positions.

9. A safety top modular door closure system as recited in claim 8, wherein each said actuator includes:
   a) a cylinder having an elongated slot therealong;
   b) a pair of mounting brackets, each located on one end of said cylinder, so that said cylinder can be retained in a stationary position to said second guide track; and
   c) a shuttle extending through the elongated slot in said cylinder to be coupled to a side of said respective door cover, said shuttle driven to slide within the elongated slot in said cylinder to operate said respective door cover.

10. A safety top modular door closure system as recited in claim 9, wherein each said flexible bumper unit includes an internal pressure switch that runs the full length of the inwardly facing edge of said door cover and is electrically connected to said respective actuator operating module, so that if any obstruction contacts one of said flexible bumper units said internal pressure switch will close to shut down said respective actuator and stop said respective door cover from closing.

11. A safety top modular door closure system as recited in claim 10, further including means for automatically closing said door covers after a preset and variable time span when said system is not being used, so that the operator does not have to manually close said door covers when the operation is complete.

12. A safety top modular door closure system as recited in claim 11, wherein said automatically closing means includes:
   a) a timer electrically connected to said electronics control module to by-pass the push button switches in said control station; and
   b) a warning beacon electrically connected to said electronics control module, which will flash when said timer is inhibited.

* * * * *